US012693408B2

(12) United States Patent
West et al.

(10) Patent No.: US 12,693,408 B2
(45) Date of Patent: Jul. 28, 2026

(54) GROUND CLUTTER SUPPRESSION AND RUNWAY IMAGING VIA RADAR GROUND MAPPING

(71) Applicant: Rockwell Collins, Inc., Cedar Rapids, IA (US)

(72) Inventors: James B. West, Cedar Rapids, IA (US); Venkata A. Sishtla, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 429 days.

(21) Appl. No.: 18/217,751

(22) Filed: Jul. 3, 2023

(65) Prior Publication Data

US 2025/0012919 A1      Jan. 9, 2025

(51) Int. Cl.
*G01S 13/90*      (2006.01)
*G01S 7/03*      (2006.01)

(52) U.S. Cl.
CPC ............... *G01S 13/90* (2013.01); *G01S 7/03* (2013.01)

(58) Field of Classification Search
CPC ......... G01S 13/90; G01S 7/03; G01S 13/933; G01S 13/4463; G01S 13/4472; G01S 13/872; G01S 13/953; G01S 7/414; G01S 2013/0245; G01S 2013/0254; G01S 2013/0263; G01S 2013/0272; H01Q 1/28; H01Q 21/0043; H01Q 21/061; H01Q 25/02; H01Q 3/2635; H01Q 1/281; H01Q 21/08
See application file for complete search history.

(56) References Cited

U.S. PATENT DOCUMENTS

| | | | |
|---|---|---|---|
| 7,504,985 B2 | 3/2009 | Henson et al. | |
| 9,128,189 B1 * | 9/2015 | West | G01S 7/03 |
| 9,568,602 B1 * | 2/2017 | Stadelmann | G01S 7/03 |
| 10,950,939 B2 * | 3/2021 | West | H01Q 3/2682 |
| 2008/0074338 A1 | 3/2008 | Vacanti | |
| 2013/0214972 A1 | 8/2013 | Woodell et al. | |
| 2016/0061949 A1 * | 3/2016 | Mohamadi | H01Q 1/28 342/21 |
| 2016/0139254 A1 * | 5/2016 | Wittenberg | G01S 13/343 342/27 |
| 2022/0308164 A1 | 9/2022 | Sishtla et al. | |

FOREIGN PATENT DOCUMENTS

| | | |
|---|---|---|
| KR | 101779900 B1 | 9/2017 |
| WO | 2012093392 A1 | 7/2012 |

OTHER PUBLICATIONS

European Search Report received in EP Application No. 24181505.4, Nov. 28, 2024, 9 pages.

* cited by examiner

*Primary Examiner* — Yonghong Li
(74) *Attorney, Agent, or Firm* — Suiter Swantz IP

(57) ABSTRACT

A radar system includes an AESA and at least one ground mapping linear array that operate on a separate receive channel and send I/Q digital terrain mapping data to a radar processing unit. The linear arrays provide constant ground mapping. The AESA may have more than one panel. Panels may be arranged as a chevron with the linear arrays disposed at the periphery. The AESA and linear arrays may be configured as a radar interferometer for track location and/or geolocation. The linear arrays may be configured as near field probes for insitu calibration.

15 Claims, 8 Drawing Sheets

NORMAL DOWN-LOOKING RADAR BEAM ELEVATION

LINEAR ARRAY GROUND MAP BEAM: ELEVATION.

COMBINED BEAMS: ELEVATION PERSPECTIVE

TERRAIN

400

402

402

400

GM LA BEAM #1

600

602

GM LA BEAM #2

LINEAR ARRAY GROUND MAP BEAM: ELEVATION.

600

602

LINEAR ARRAY GROUND MAP BEAM: AZIMUTH.

704

TERRAIN

702

700

COMBINED BEAMS: ELEVATION PERSPECTIVE

702

700

704

COMBINED BEAMS: AZIMUTH PERSPECTIVE

CHEVRON'S RIGHT PLANAR AESA

CHEVRON'S LEFT PLANAR AESA

RIGHT GROUND MAPPING LINEAR ARRAY 1A

LEFT GROUND MAPPING LINEAR ARRAY 2A

GROUND MAPPING LINEAR ARRAY 1A

GROUND MAPPING LINEAR ARRAY 1A

PLANAR SYNTHETIC ARRAY SCAN BOUNDARY

CHEVON PLANAR SYNTHETIC APERTURE MAIN BEAM

GROUND CLUTTER SUPPRESSION AND RUNWAY IMAGING VIA RADAR GROUND MAPPING

BACKGROUND

Traditional commercial airborne weather radar systems utilize a simple ground clutter suppression (GCS) algorithm for predictive wind shear (PWS) detection that relies on high-performance mechanically driven slotted waveguide array antennas. Such antennas have a main beam gain slope that is a function of the angle between the beam peak and the first radiation pattern down looking null adjacent to the main beam. Very low peak side lobe levels (SLL) (−30 dBp 1-way) are required to realize −60 dB 2-way monostatic radar SLLs required for existing PWS GCS.

The characteristics of slotted waveguide antenna arrays are exploited to differentially detect runway landing PWS by aggressively attenuating undesirable ground returns that masks the low radar cross section (RCS) wind shear, a very time transient meteorological phenomenon.

Analog AESAs commonly transmit in uniform aperture illumination to maximize effective isotropic radiated power (EIRP) to maximize power on target in order to maximize radar range/radar performance index (RPI). Maximum EIRP requires a uniform aperture illumination to maximize the aggregate PA power; uniform illumination dictates −13.5 dBp SLLs in accordance to array theory. Uniform illumination in transmit (Tx) and −30 dBp sidelobes in receive (Rx) results in a −43.5 dBp 2-way SLL; 16.5 worse than that used for current state PWS GCS algorithms.

An analog AESA with low Tx SLLs severely penalizes EIRP. The degradation is even worse for large AESA scan angles off boresight. It would be advantageous to have a radar system that is affective for attenuating

SUMMARY

In one aspect, embodiments of the inventive concepts disclosed herein are directed to a radar system with an AESA and at least one ground mapping linear array that operate on a separate receive channel and send I/Q digital terrain mapping data to a radar processing unit. The linear arrays provide constant ground mapping.

In a further aspect, the AESA may have more than one panel. Panels may be arranged as a chevron with the linear arrays disposed at the periphery.

In a further aspect, the AESA and linear arrays may be configured as a radar interferometer for track location and/or geolocation.

In a further aspect, the linear arrays may be configured as near field probes for insitu calibration.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
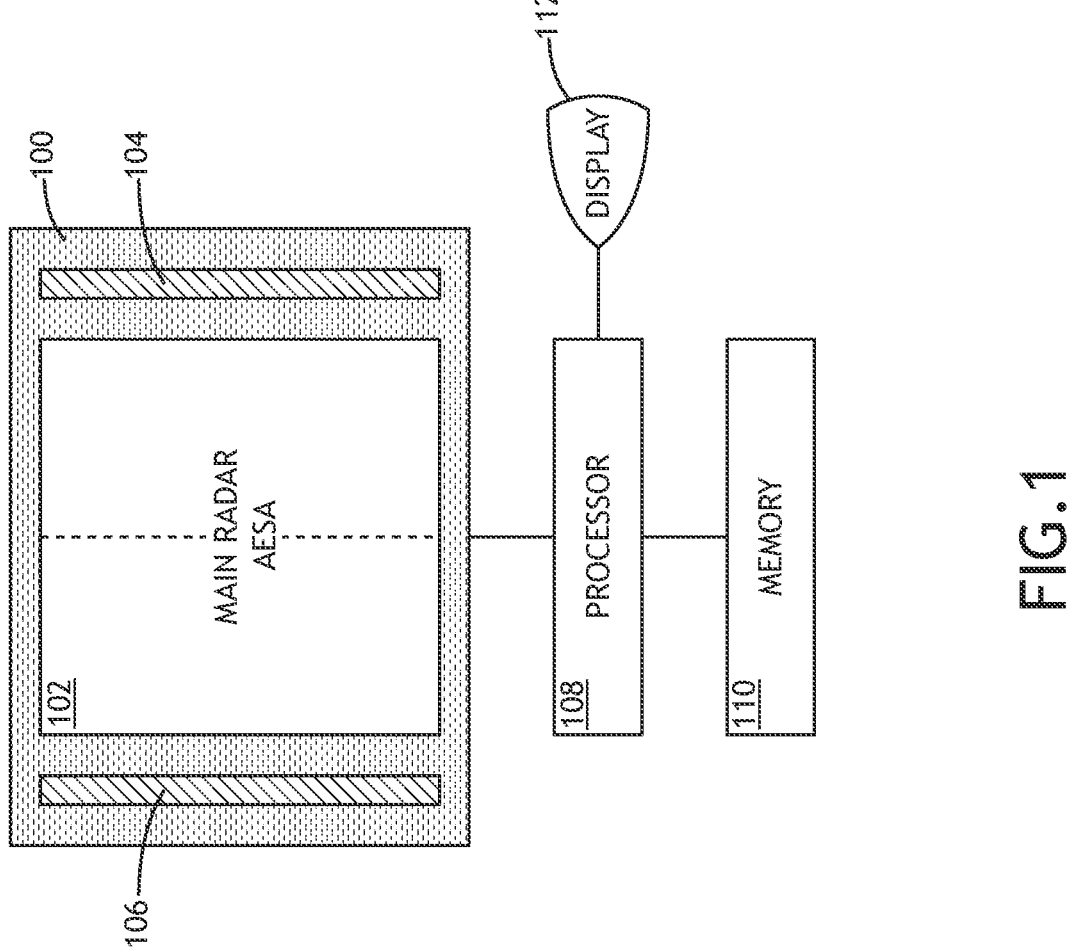
FIG. 1 shows a block diagram of an antenna system according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a radar system with an AESA and at least one ground mapping linear array that operate on a separate receive channel and send I/Q digital terrain mapping data to a radar processing unit. The linear arrays provide constant ground mapping. The AESA may have more than one panel. Panels may be arranged as a chevron, or as a tri-panel architecture, etc., with the linear arrays disposed at the periphery. The AESA and linear arrays may be configured as a radar interferometer for track location and/or geolocation. The linear arrays may be configured as near field probes for insitu calibration.

Referring to FIG. 1, a block diagram of an antenna system 100 according to an exemplary embodiment is shown. The antenna system 100 includes an AESA 102 operating as a multimode radar. The AESA 102 may be configured for weather, PWS, fail detection, HAC, volcanic ash, bird strike, or the like; runway imaging for landing and taxiway obstacle detection/avoidance; autonomous flight; etc.

The antennas system 100 also includes one or more linear arrays 104, 106 disposed vertically, and proximal to the AESA 102. The linear arrays 104, 106 may be slotted wave guide linear array sticks with cosecant squared ($CSC^2$) beam in elevation and a fan beam in azimuth. In at least one embodiment, the linear arrays 104, 106 may operate on a separate receive channel. The linear arrays 104, 106 send I/Q terrain mapping data to a radar processing unit 108, configured by non-transitory processor executable code to identify ground clutter. The linear arrays 104, 106 and radar processing unit 108 produce a continuous ground mapping through all mission phases, regardless of the state of the AESA 102. In at least one embodiment, the linear arrays 104, 106 (and corresponding linear array channels) may be both Rx and Tx for both ground mapping and insitu AESA calibration.

In at least one embodiment, the linear arrays 104, 106 contiguously map terrain in front of and below an aircraft. The processor 108 may then remove ground clutter identified via the linear arrays 104, 106 from the main beam of the AESA 102 to realize GCS. Because the linear arrays 104, 106 produce a fan beam, they illuminate greater terrain in azimuth. The ground map gain threshold can be adjusted via a variable gain amplifier (VGA) or automatic gain control (AGC) as necessary. The ground beam may be fixed or staring. Adjunct terrain maps may be synched with the generated terrain map for increased fidelity.

It may be appreciated that other fan beam radiation patterns shapes can be used. In at least one embodiment, the linear arrays 104, 106 may be embodied in AESA antennas. AESA linear arrays 104, 106 may change the fan beam radiation patterns as a function of time, mission phase, etc.

Figure 2:
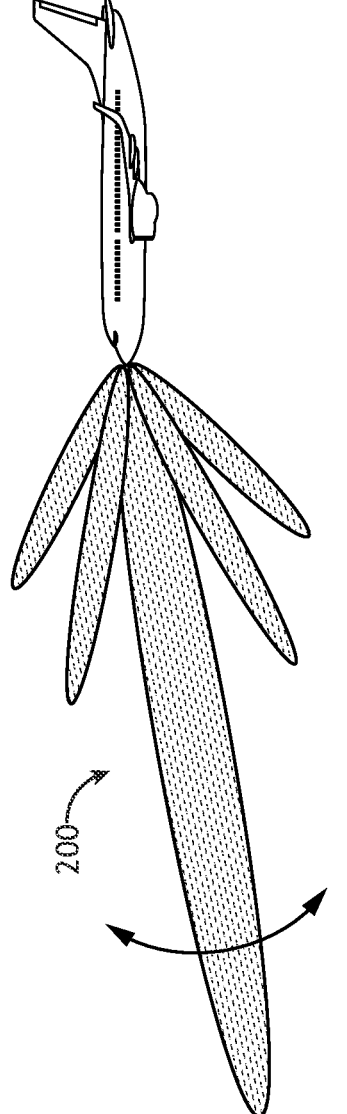
FIG. 2 shows environmental representations of a radiation pattern.
Figure 2:
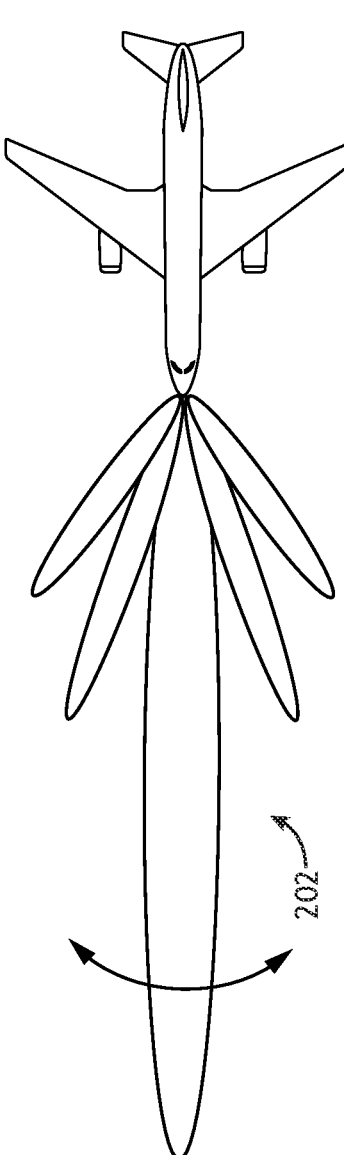
Figure 3:
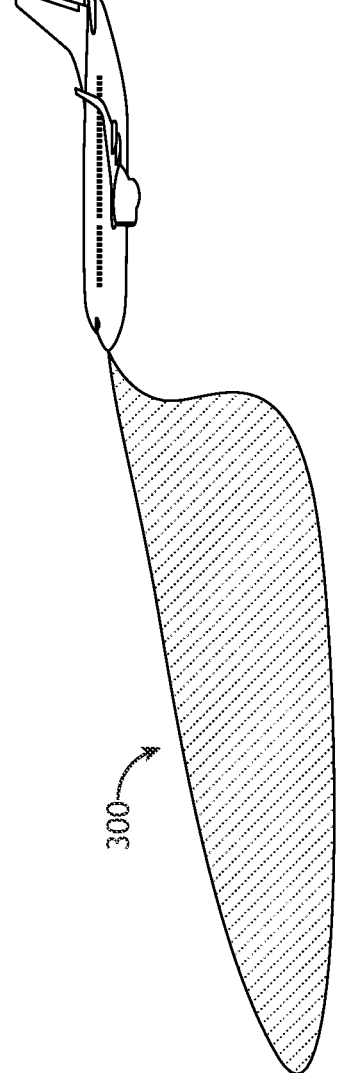
FIG. 3 shows environmental representations of a radiation pattern.
Figure 3:
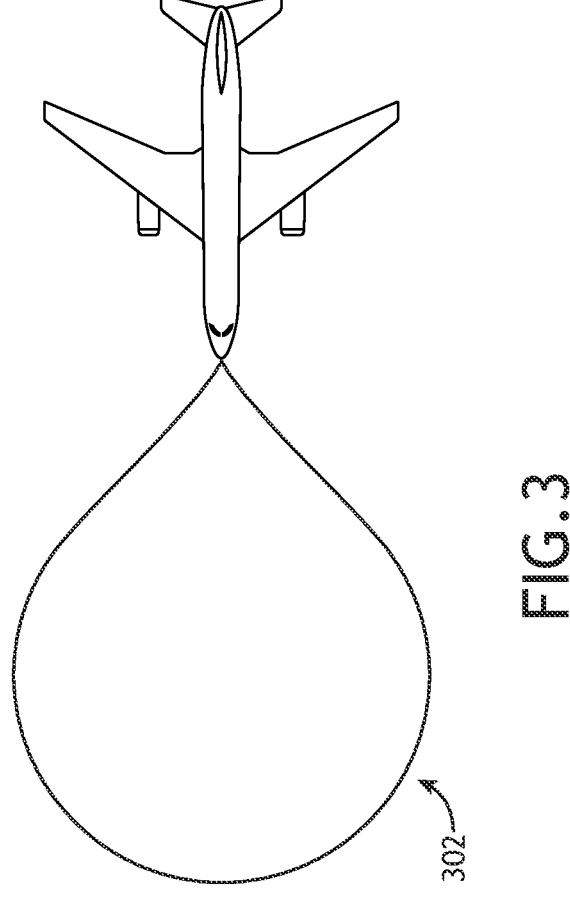

Referring to FIGS. 2 and 3, environmental representations of radiation patterns are shown. An aircraft radar system with an AESA may produce an elevation radiation pattern 200 and azimuthal radiation pattern 202 with a main beam and sidelobes. A linear array may produce an elevation fan beam 300 and azimuthal fan beam 302.

Figure 4:
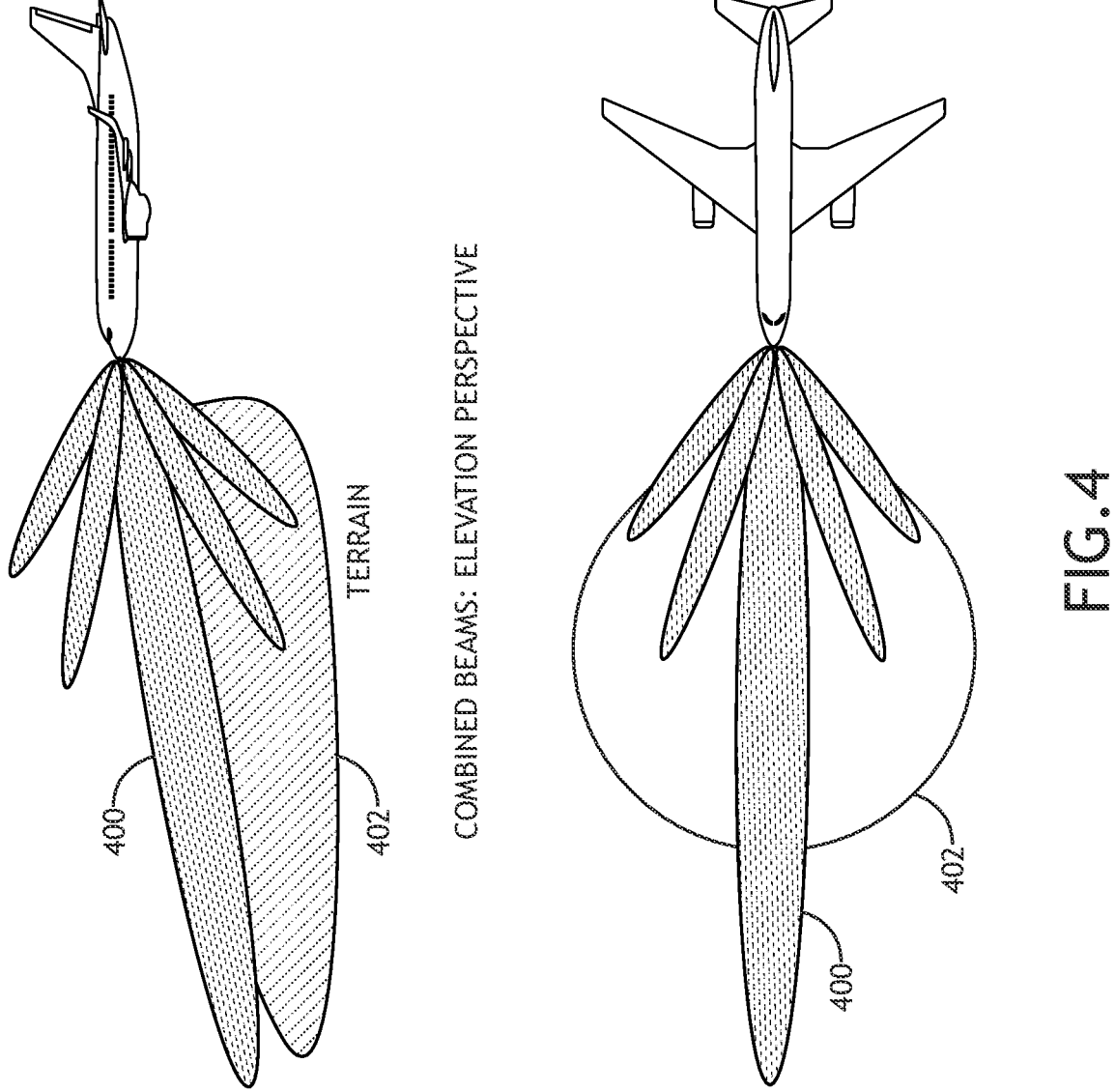
FIG. 4 shows environmental representations of a radiation pattern according to an exemplary embodiment.

Referring to FIG. 4, environmental representations of a radiation pattern according to an exemplary embodiment are shown. An antenna with an AESA and a linear array may produce both a multimode radiation pattern 400 and a fan beam 402 simultaneously. The multimode radiation pattern 400 and fan beam 402 may be configured to operate in separate channels. Furthermore, the linear array may be configured to operate only in a receive mode.

Figure 5:
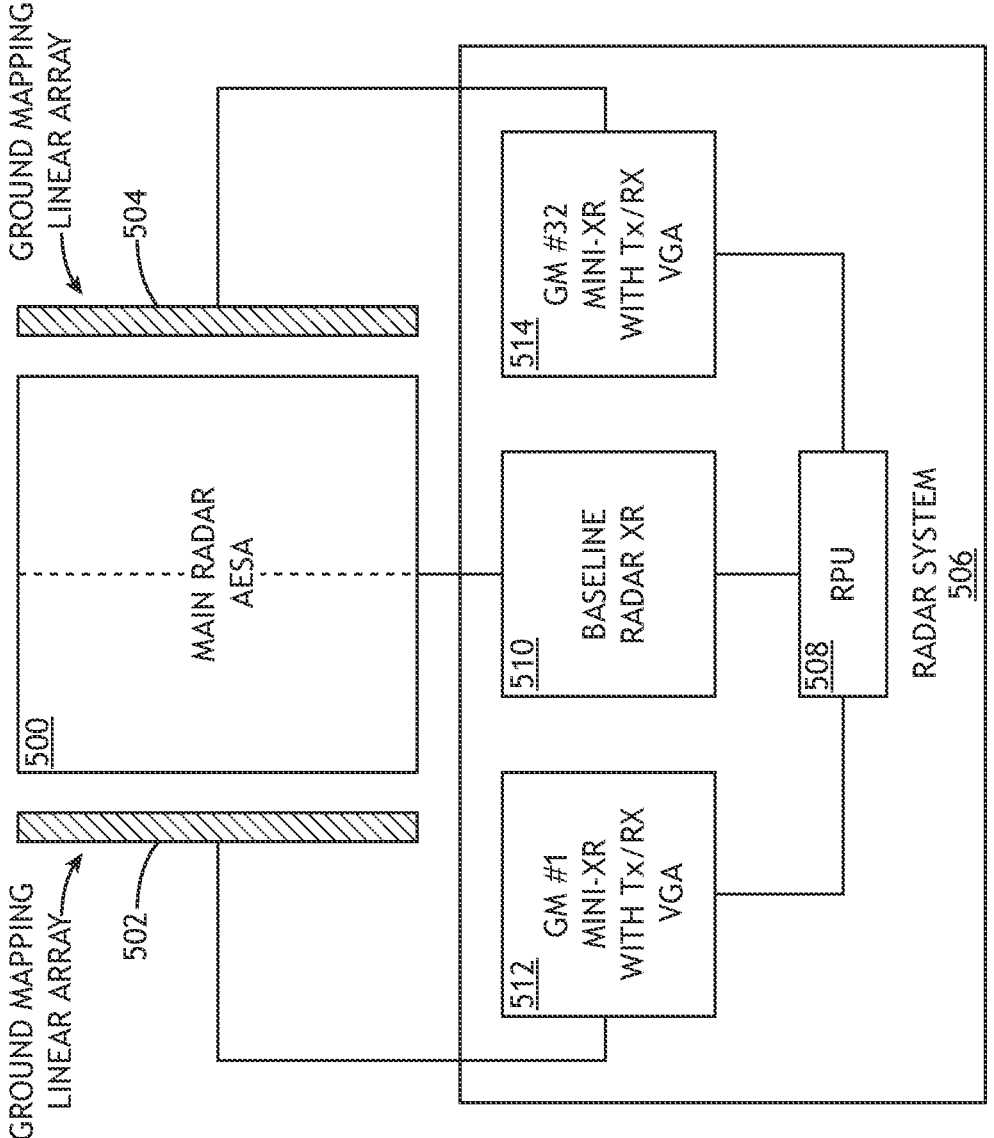
FIG. 5 shows a block diagram of a radar system according to an exemplary embodiment.

Referring to FIG. 5, a block diagram of radar system 506 according to an exemplary embodiment is shown. The radar system 506 includes an AESA main radar antenna 500 and two ground mapping linear array antennas 502, 504 disposed vertically along edges of the AESA main radar antenna 500. The linear array antennas 502, 504 may comprise slotted waveguide sticks. Alternatively, or in addition, the linear arrays 502, 504 may comprise one dimensional AESAs, embedded within the greater AESA main radar antenna 500. Alternatively, the linear arrays 502, 504 may be printed circuit board based linear arrays or AESA beam scanned linear arrays. Linear array AESAs may produce radiation patterns that can be dynamically changed over time based on flight mission phasing, radar mode, etc.

A radar processing unit 508 configures the AESA main radar antenna 500 and the linear arrays 502, 504, and receives signals from the AESA main radar antenna 500 and the linear arrays 502, 504, via corresponding Tx/Rx modules 510, 512, 514. In at least one embodiment, the Tx/Rx modules 510, 512, 514 may include filters and amplifiers such VGAs and AGCs. The relative Tx EIRP and Rx total gain for the linear arrays 502, 504 may be dynamically adjusted relative the AESA main beam. It may be appreciated that the driving and receive electronics may be conventional RF PCB electronics, or implemented as one or more systems on a chip.

The nominal azimuth pointing angle of each linear array 502, 504 may be offset relative to the corresponding aircraft's fuselage as needed for specific functionality requirements. In at least one embodiment, the linear arrays 502, 504 may be limited to Rx only to reduce component complexity.

For one dimensional AESA linear arrays 502, 504, dynamic elevation pattern spacing is possible to utilize the linear arrays 502, 504 for other radar functions. In at least one embodiment, the linear arrays may be repurposed as Rx and Tx near field probes for insitu calibration of the AESA main radar antenna 500.

In at least one embodiment, the linear arrays 502, 504 may be configured for one dimensional monopulse operation. Monopulse capabilities (in elevation) enable the radar system 506 to sharpen the beam for better imaging.

In at least one embodiment, the linear arrays 502, 504, potentially in conjunction with the AESA's main radar antenna 500, may be configured as a radar interferometer for precision track location, geolocation, and the like.

Figure 6:
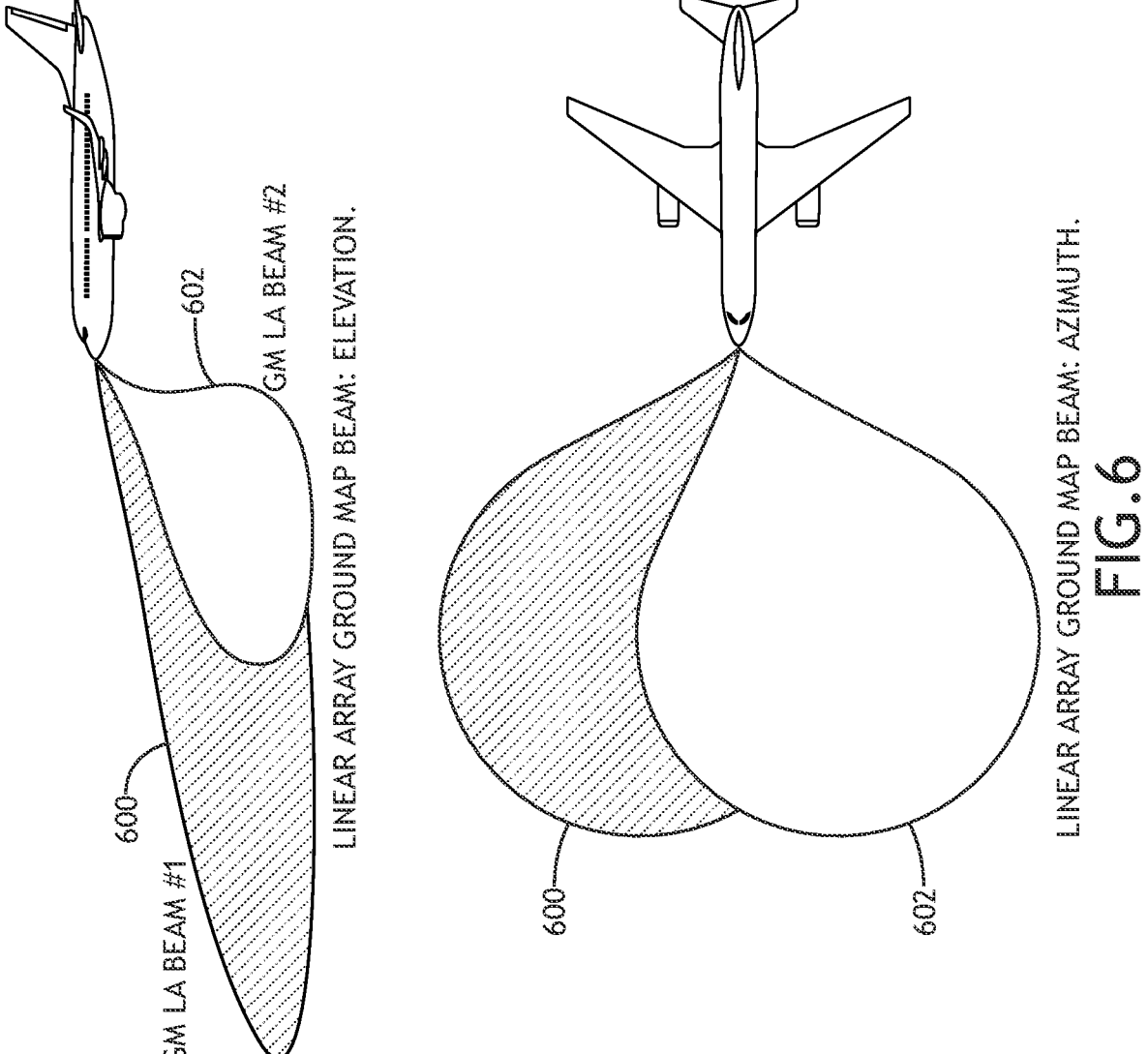
FIG. 6 shows environmental representations of radiation patterns according to an exemplary embodiment.

Referring to FIG. 6, environmental representations of radiation patterns according to an exemplary embodiment are shown. Where a system includes two or more linear arrays, the system may produce a plurality of partially overlapping fan beams 600, 602.

Figure 7:
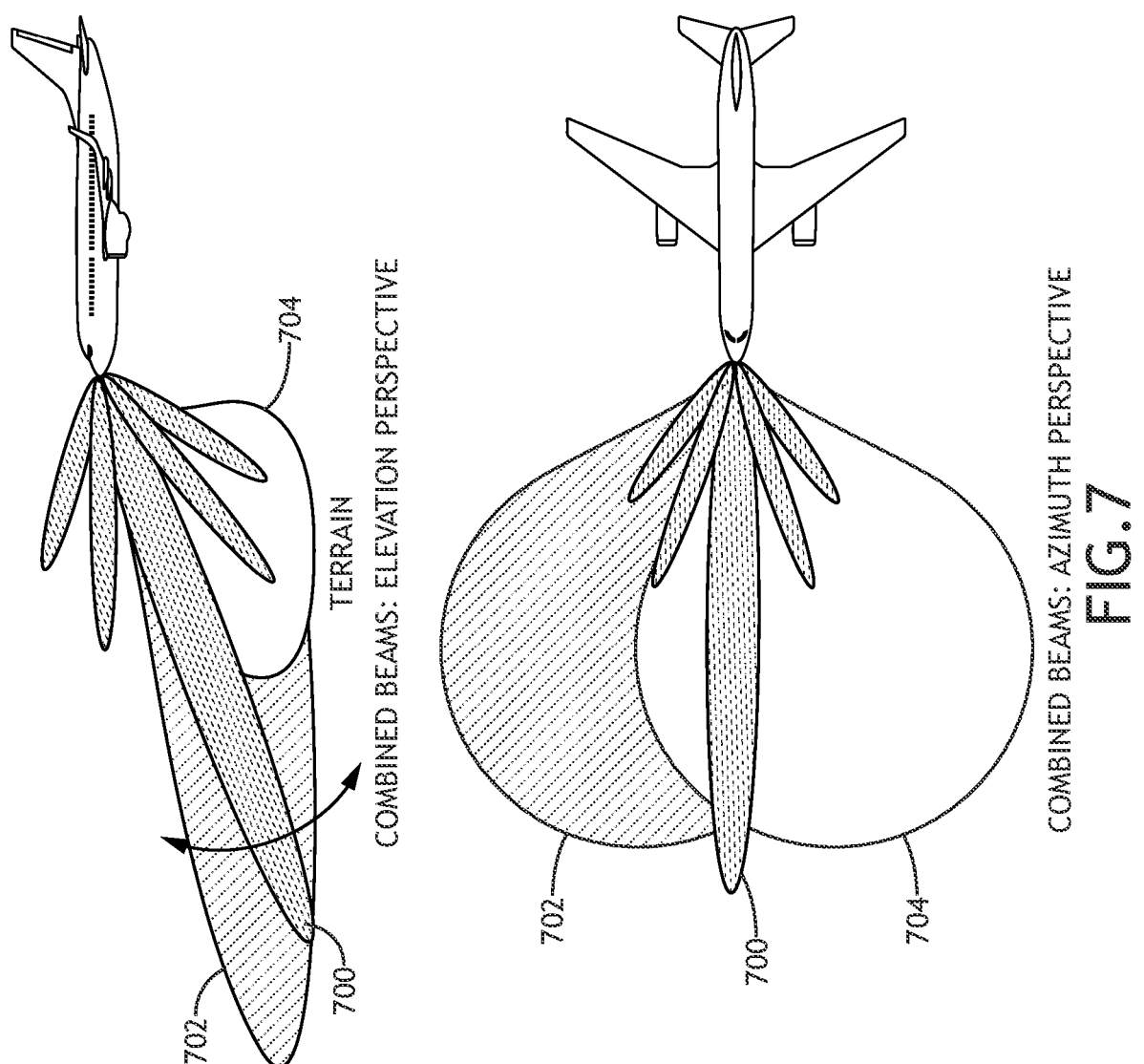
FIG. 7 shows environmental representations of a radiation pattern according to an exemplary embodiment.

Referring to FIG. 7, environmental representations of a radiation pattern according to an exemplary embodiment are shown. A system with an AESA radar antenna and two or more linear arrays may produce both a multimode AESA main beam 700 radiation pattern and partially overlapping fan beams 702, 704 simultaneously. The AESA main beam 700 and fan beams 702, 704 may be configured to operate in separate channels. Furthermore, the linear arrays may be configured to operate only in a receive mode.

Overlapping fan beams 702, 704 enhance ground coverage, both in elevation and azimuth. Mechanical positioning of linear arrays may optimize the azimuthal and elevation ground mapping fan beam 702, 704 overlap for a given aircraft type. The fan beams 702, 704 may be of the same pattern synthesis or two unique beam depending on systems requirements. While embodiments represented include two linear arrays and two fan beams 702, 704, it may be appreciated that three or more linear arrays radar channels are envisioned.

Figure 8:
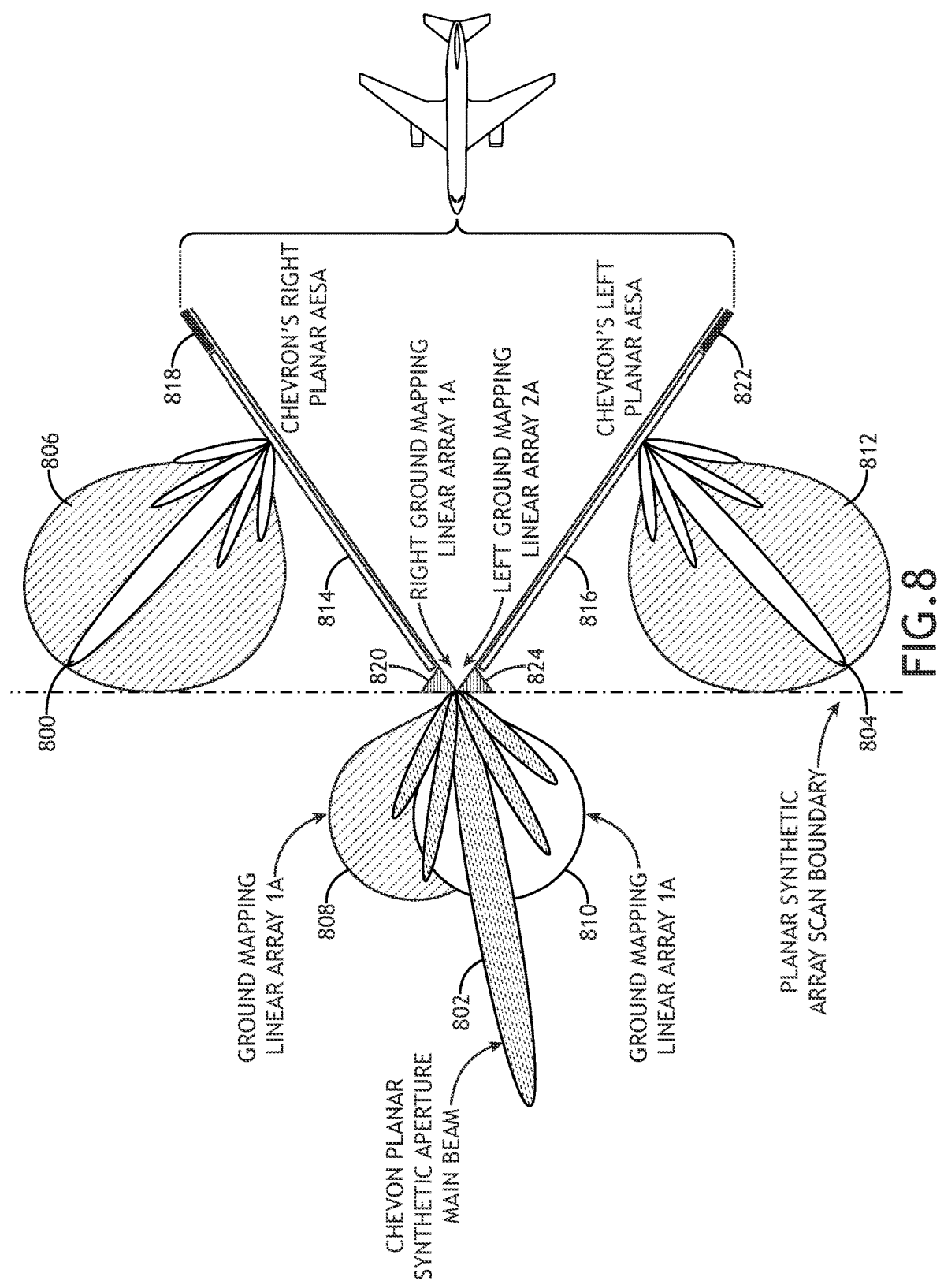
FIG. 8 shows a block diagram of an antenna system according to an exemplary embodiment.

Referring to FIG. 8, a block diagram of an antenna system according to an exemplary embodiment is shown. In at least one embodiment, the system includes at least two AESA panels 814, 816 organized at angles to each other (e.g., a chevron). The AESA panels 814, 816 may individually produce corresponding main beam radiation patterns 800, 804 and a synthetic aperture main beam 802.

The antenna system also includes a plurality of linear arrays 818, 820, 822, 824. Peripheral linear arrays 818, 822 may be disposed at the periphery of the AESA panels 814, 816 while coincident linear arrays 820, 824 are disposed at the interface between the AESA panels 814, 816. In at least one embodiment, the coincident linear arrays 820, 824 may be rotated to look forward with respect to the corresponding aircraft's fuselage. Likewise, the peripheral linear arrays 818, 822 are disposed to look perpendicular to the proximal AESA panel 814, 816.

In at least one embodiment, the peripheral linear arrays 818, 822 each produce a corresponding ground mapping beam 806, 812. Furthermore, the coincident linear arrays 820, 824 produce at least partially overlapping, forward facing, ground mapping beams 808, 810.

An antenna system including angularly offset AESA panels 814, 816 and corresponding linear arrays 818, 820, 822, 824 enables robust, greater than ±90° azimuthal GSC. Furthermore, more than two AESA panels 814, 816 and corresponding linear arrays 818, 820, 822, 824 are envisioned. For example, embodiments may employ three AESA panels 814, 816 with linear arrays 818, 820, 822, 824 disposed between the AESA panels 814, 816 and at the periphery of the AESA panels 814, 816.

Embodiments of the present disclosure enable superior GCS with AESA radar systems, identification and elimination of ground targets for predictive windshear detection, and creation of high-resolution ground maps to distinguish between weather phenomena and ground.

Additional radar functionality such as insitu calibration and precision interferometry is also possible by repurposing the linear arrays. The ground mapping beam is highly suited for airport/runway environment mapping; a $CSC^2$ beam is an attractive beam shape option as it covers the entire length of a runway during an aircraft landing approach. Other, more unique linear beam shapes can be utilized if required.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A radar antenna comprising:
   at least one active electronically scanned array (AESA) panel; and
   at least two linear arrays disposed along edges of the AESA panel,
   wherein each linear array is configured to generate a fixed-elevation ground-mapping fan beam having a cosecant squared ($CSC^2$) azimuth profile, and the at least two linear arrays are oriented such that their respective ground-mapping fan beams are at least partially overlapped in elevation to provide continuous near-ground coverage.

2. The radar antenna of claim 1, wherein the at least one AESA panel and the at least two linear arrays are configured to operate in different channels.

3. The radar antenna of claim 1, further comprising a radar processing unit, wherein the radar processing unit configures at least one linear array to operate in a one dimensional monopulse mode.

4. The radar antenna of claim 1, wherein the at least one AESA panel and the at least two linear arrays comprise distinct regions of an electronically scanned array.

5. The radar antenna of claim 1, wherein the at least one AESA panel comprises two AESA panels disposed in a chevron configuration.

6. The radar antenna of claim 5, wherein the at least two linear arrays comprises four linear arrays, two disposed proximal to opposing edges of each AESA panel, and coincident linear arrays of each AESA panel disposed to produce the at least partially overlapping ground mapping fan beams.

7. A radar system comprising:
   a radar antenna comprising:
      at least one active electronically scanned array (AESA) panel; and
      at least two linear arrays disposed along edges of the AESA panel; and
   at least one processor in data communication with a memory storing processor executable code for configuring the at least one processor to:
      drive the at least one AESA panel to produce a multimode main radar beam; and
      drive the at least two linear arrays to produce ground mapping fan beams,
   wherein each linear array is configured to generate a fixed-elevation ground-mapping fan beam having a cosecant squared ($CSC^2$) azimuth profile, and the at least two linear arrays are oriented such that their respective ground-mapping fan beams are at least partially overlapped in elevation to provide continuous near-ground coverage.

8. The radar system of claim 7, wherein the at least one processor configures the at least one AESA panel and the at least two linear arrays to operate in different channels.

9. The radar system of claim 7, wherein the at least one AESA panel comprises two AESA panels disposed in a chevron configuration.

10. The radar system of claim 9, wherein the at least two linear arrays comprise four linear arrays, two disposed proximal to opposing edges of each AESA panel, and coincident linear arrays of each AESA panel disposed and driven to produce the at least partially overlapping ground mapping fan beams.

11. An aircraft comprising:
a radar antenna comprising:
at least one active electronically scanned array (AESA) panel; and
at least two linear arrays disposed along edges of the AESA panel; and
at least one processor in data communication with a memory storing processor executable code for configuring the at least one processor to:
drive the at least one AESA panel to produce a multi-mode main radar beam; and
drive the at least two linear arrays to produce ground mapping fan beams, wherein each linear array is configured to generate a fixed-elevation ground-mapping fan beam having a cosecant squared ($CSC^2$) azimuth profile, and the at least two linear arrays are oriented such that their respective ground-mapping fan beams are at least partially overlapped in elevation to provide continuous near-ground coverage.

12. The aircraft of claim 11, wherein the at least two linear arrays each comprises an AESA, and the at least one processor electronically alters a shape of the ground mapping fan beam of each of the at least two linear arrays over time.

13. The aircraft of claim 11, wherein the at least one processor configures the at least one AESA panel and the at least two linear arrays to operate in different channels.

14. The aircraft of claim 11, wherein the at least one AESA panel comprises two AESA panels disposed in a chevron configuration.

15. The aircraft of claim 14, wherein the at least two linear arrays comprise four linear arrays, two disposed proximal to opposing edges of each AESA panel, and coincident linear arrays of each AESA panel disposed and driven to produce the at least partially overlapping ground mapping fan beams.

\* \* \* \* \*